No. 776,266. PATENTED NOV. 29, 1904.
L. SEIBT & J. Q. COOK.
CLUTCH.
APPLICATION FILED JUNE 6, 1904.
NO MODEL. 2 SHEETS—SHEET 1.
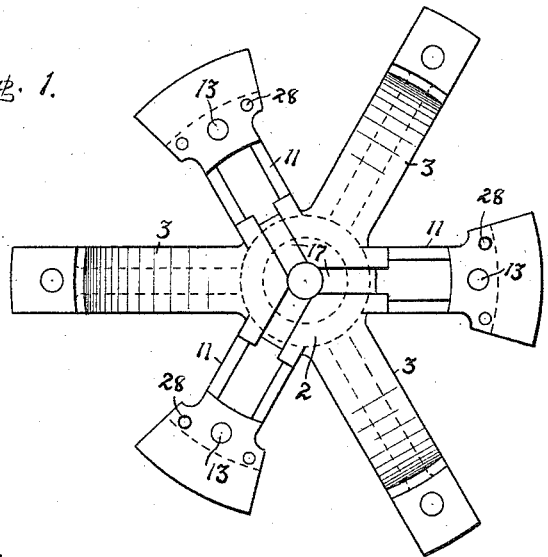
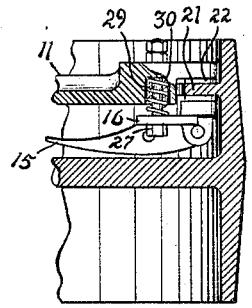
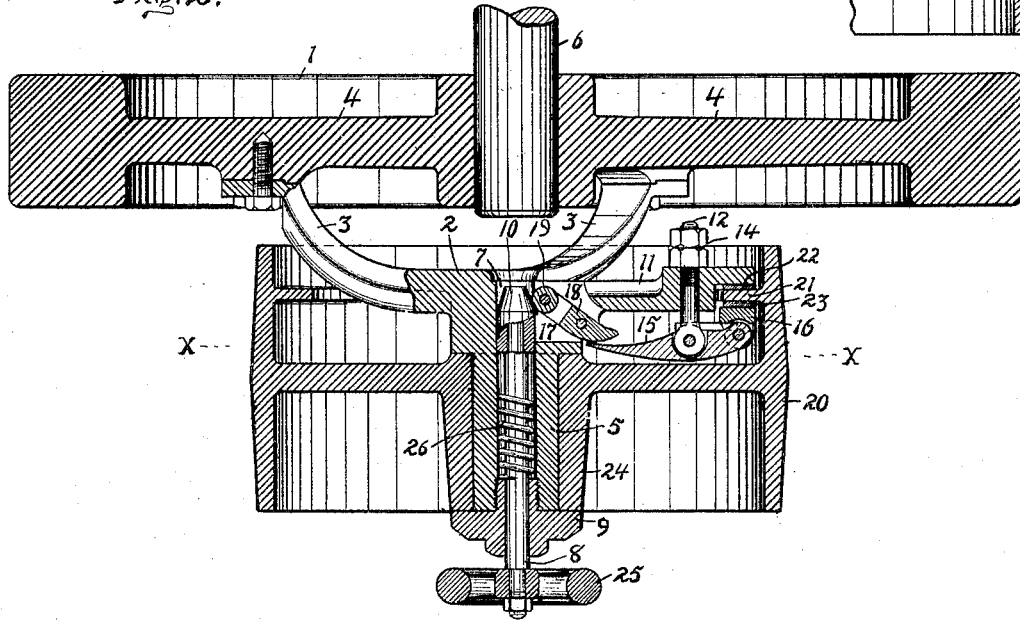
WITNESSES: Louis Seibt and Jerome Q. Cook INVENTORS
BY their ATTORNEY

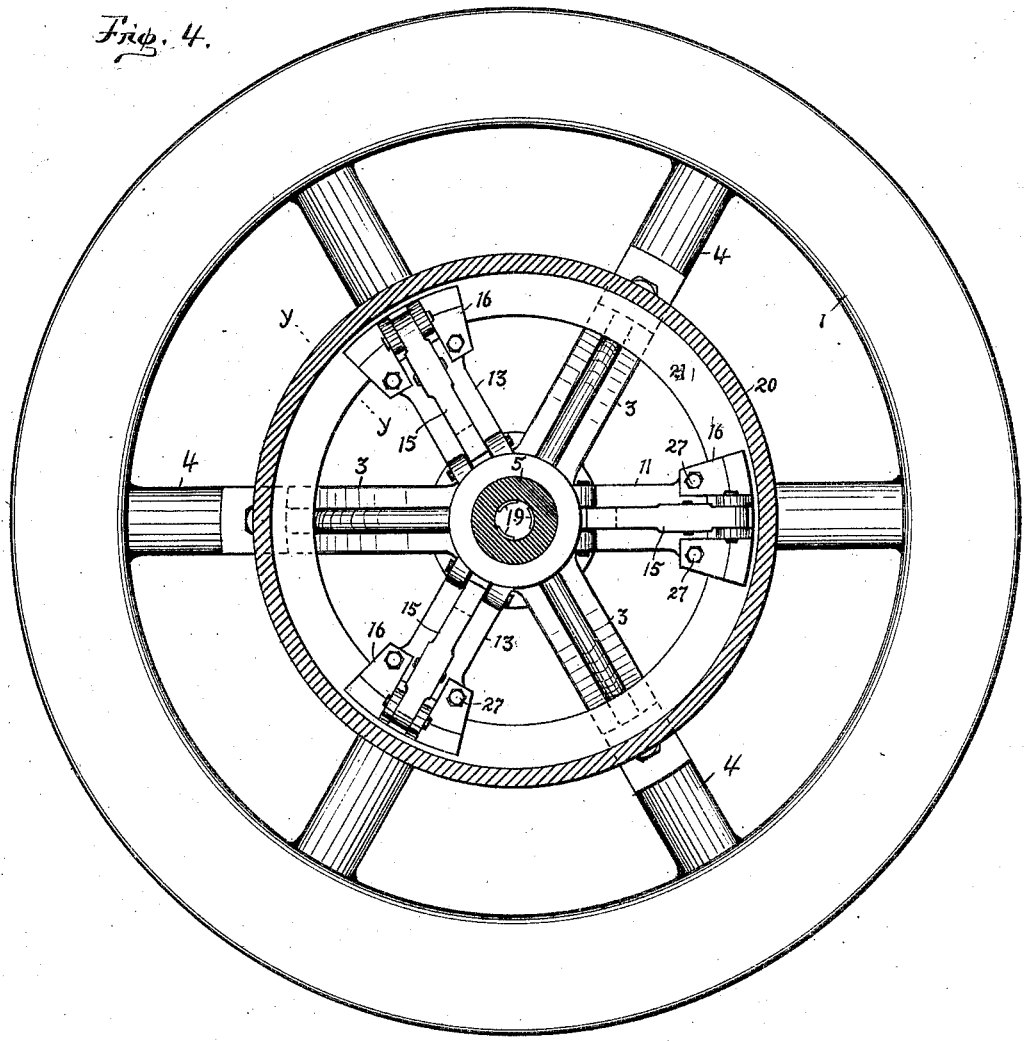

No. 776,266.  
Patented November 29, 1904.

UNITED STATES PATENT OFFICE.

LOUIS SEIBT AND JEROME Q. COOK, OF FORT WAYNE, INDIANA, ASSIGNORS TO FORT WAYNE FOUNDRY AND MACHINE COMPANY, A CORPORATION OF INDIANA.

CLUTCH.

SPECIFICATION forming part of Letters Patent No. 776,266, dated November 29, 1904.

Application filed June 6, 1904. Serial No. 211,240. (No model.)

*To all whom it may concern:*

Be it known that we, LOUIS SEIBT and JEROME Q. COOK, citizens of the United States of America, and residents of Fort Wayne, in the county of Allen and State of Indiana, have invented certain new and useful Improvements in Clutches, of which the following is a specification.

This invention relates to improvements in clutches; and the object thereof is to afford clutch mechanism adapted to be used in connection between the fly-wheel of a gas-engine and the belt-wheel thereof. We accomplish this object by the construction illustrated in the accompanying drawings, in which—

Figure 1 is an end view of the supporting-spider. Fig. 2 is a transverse section of a fly-wheel and belt-wheel with the clutch mechanism arranged in connection therewith. Fig. 3 is a section of a portion of a belt-wheel on the line *y y* of Fig. 4, showing one of the clutch-dogs in connection therewith. Fig. 4 is an end elevation of the engine-wheel and clutch mechanism, showing the belt-wheel and the hub of the spider in section on the line *x x* of Fig. 2.

Similar numerals of reference indicate corresponding parts throughout the several views, and referring now to the same—

1 is the fly-wheel of an engine.

2 is a spider, the legs 3 of which are suitably secured to the arms 4 of the fly-wheel and the hub 5 of which ranges with its axial center in line with that of the engine-shaft 6. The said spider has a central bore 7, which extends through the hub thereof. An operating-rod 8 ranges centrally in said bore and is supported at its outer part by the cap 9 and has at its inner end a head 10. The said spider has also arms 11, which extend radially from points intervening the legs 3. Anchor-bolts 12 extend loosely through holes 13 near the outer ends of the arms 11 and have fixed thereon suitable adjusting-nuts 14. Upon the ends of said bolts opposite said nuts are pivotally-connected clutch-levers which carry at their outer ends shoes 16, the latter being adapted to be actuated by said clutch-levers. Recesses 17 range in said spider in line with the arms thereof and extend into its central bore 7 and have pivoted, respectively, therein actuating-levers 18, the outer ends of which are adapted to engage the inner ends of said clutch-levers and actuate the same. 19 represents small antifriction-wheels mounted at the inner ends of said actuating-levers and are adapted to be engaged by the head 10, and thus the said actuating-levers 18 are moved. Upon the hub 5 of said spider is rotatively mounted the belt-wheel 20, which has an internal annular flange 21, the latter ranging between the outer ends of the arms 11 and said shoe 16. Friction-plates 22 are secured upon the faces of the arms 11 adjacent the flange 21, and like plates 23 are secured upon the corresponding faces of the shoes 16, and when said clutch-levers are actuated the said flange 21 is held more or less tightly between said friction-plates because of the consequent clamping action between the outer ends of the arms 11 and the shoes 16. Thus the belt-wheel when the flange 23 is thus engaged will be caused to rotate with the spider until released. The cap 9 extends beyond the hub 24 of the belt-wheel 20 and prevents it from derangement respecting the hub 5 of the spider. At the outer end of the operating-rod 8 is loosely mounted a hand-wheel 25, by which said rod is adapted to be moved longitudinally in the bore of the hub 5, and a cushion-spring 26 is interposed within the bore 7 between the cap 9 and the head 10, but is not of such length as to hinder the free movement of the operating-rod 8 until the head 10 thereon has been completely disengaged from the actuating-levers 18. The purpose of the spring is to afford an easy stop for the operating-rod and also to prevent said rod from being drawn outward an unnecessary distance.

To assist in the disengagement of the shoes 16 from the flange 21, supporting-bolts 27 are arranged in the arms 11 at points indicated at 28 and extend loosely through said shoes, so as to permit movement thereof toward said arms. Recesses 29 are made in said arms 11 at points coincident with the bolts 27, and suitable springs 30 are arranged in said recesses and are adapted to exert pressure between said arms and shoes 16, and thus tend to hold said shoes from engagement with the flange 21.

In the operation of this invention before starting the engine the operating-rod 8 is pulled downward, so that the head 10 becomes disengaged from the actuating-levers 18. Then when the engine is in full motion the operating-rod is thrust inward, so that the head 10 will engage the actuating-levers 18, which will in turn manipulate the clutch-levers 15, and thus effect a driving engagement between the spider and the belt-wheel 20. In case the friction-plates 22 and 23 become worn to such an extent as to render the engagement between the spider and the belt-wheel 20 ineffective the adjusting-nuts 14 may be turned upon the bolts 12, and thus reduce the play between the shoes 16 and flange 21.

It will be understood that in gas-engine practice difficulty is experienced in starting the engine together with full load, and the utility of this device as applied to gas-engines will be apparent. It is not the intention, however, to confine the use of this invention in connection with gas-engines only.

Having described our invention, what we claim as new, and desire to secure by Letters Patent, is—

1. In mechanism of the class described, an engine-wheel; a spider attached to said wheel with its hub in line with the axis thereof; radial arms extending from said spider; adjustable anchor-bolts carried by said arms; clutch-levers pivoted to said anchor-bolts; shoes attached at the outer ends of said clutch-levers; a belt-wheel mounted idly upon the hub of said spider; an internal flange carried by the said belt-wheel, ranging between the said arms and shoes, and being adapted to be engaged thereby; and means to operate said clutch-levers.

2. In mechanism of the class described, a supporting-spider having a central hub; arms extending from said spider; anchor-bolts carried by said arms; clutch-levers pivoted to said anchor-bolts; shoes attached at the outer ends of said clutch-levers; supporting-bolts secured to said arms and ranging loosely through said shoes; a belt-wheel mounted idly upon the hub of said spider; an internal flange carried by said belt-wheel, ranging between the said arms and shoes, and being adapted to be engaged thereby; and means to operate said clutch-levers.

3. In mechanism of the class described, a supporting-spider having a central hub; arms extending from said spider; clutch-levers having anchored connections with said arms; shoes attached at the outer ends of said clutch-levers; supporting-bolts carried by said arms and ranging loosely through said shoes; springs interposed between said shoes and arms respectively; a belt-wheel mounted idly upon the hub of said spider; an internal flange carried by said belt-wheel, ranging between the said arms and shoes, and being adapted to be frictionally engaged thereby; and means to operate said clutch-levers.

4. In mechanism of the class described, a supporting-spider having a central hub; arms extending from said spider; clutch-levers having anchored connections with said arms; shoes attached at the outer ends of said clutch-levers; actuating-levers pivoted in said spider; having engagements respectively, with said clutch-levers, and being adapted to actuate the same; a belt-wheel mounted idly upon the hub of said spider; an internal flange carried by said belt-wheel, ranging between the said arms and shoes, and being adapted to be frictionally engaged thereby; and means to operate said actuating-levers.

5. In mechanism of the class described, a supporting-spider having a central hub; arms extending from said spider; clutch mechanism carried by said arms; a belt-wheel mounted idly upon the hub of said spider, and being adapted to become engaged by said arms and clutch mechanism; actuating-levers mounted in said spider and having connections with said clutch mechanism to actuate the same; a rod ranging centrally in the hub of said spider, and being adapted to engage and operate said actuating-levers; and a hand-wheel loosely mounted upon the outer end of said rod.

6. In mechanism of the class described, a spider having supporting-lugs, radial arms, and a central hub, combined with a belt-wheel mounted idly upon said hub; clutch mechanism carried by said arms and adapted to engage said belt-wheel; actuating-levers, carried by the spider, adapted to actuate said clutch mechanism; and means ranging within said hub to operate said actuating-levers.

In testimony whereof we affix our signatures in presence of two witnesses.

LOUIS SEIBT.
    JEROME Q. COOK.

Witnesses:
 F. S. LIGHTFOOT,
 A. W. PICKARD.